United States Patent
Mathur et al.

(10) Patent No.: US 11,522,855 B2
(45) Date of Patent: Dec. 6, 2022

(54) TUNNEL CONNECTIONS ESTABLISHED USING SECURE PROTOCOL

(71) Applicant: Oracle International Corporation, Redwood Shores, CA (US)

(72) Inventors: Bhaskar Mathur, Bengaluru (IN); Feroz Alam Khan, Bengaluru (IN); Abhishek Dadhich, Bengaluru (IN); Kant C. Patel, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 194 days.

(21) Appl. No.: 16/937,030

(22) Filed: Jul. 23, 2020

(65) Prior Publication Data
US 2022/0029989 A1    Jan. 27, 2022

(51) Int. Cl.
*H04L 29/06*    (2006.01)
*H04L 9/40*    (2022.01)
*G06F 21/62*    (2013.01)

(52) U.S. Cl.
CPC ...... *H04L 63/0876* (2013.01); *G06F 21/6227* (2013.01); *H04L 63/029* (2013.01); *H04L 63/0236* (2013.01); *H04L 63/20* (2013.01)

(58) Field of Classification Search
CPC ............. H04L 63/0876; H04L 63/0236; H04L 63/029; H04L 63/20; G06F 21/6227
USPC .......................................................... 726/4
See application file for complete search history.

(56) References Cited

U.S. PATENT DOCUMENTS

| | | | |
|---|---|---|---|
| 6,081,900 A * | 6/2000 | Subramaniam | H04L 63/0807 713/153 |
| 9,888,290 B1 * | 2/2018 | Malhotra | H04M 15/83 |
| 2014/0282817 A1 * | 9/2014 | Singer | H04L 63/08 726/1 |
| 2016/0241633 A1 * | 8/2016 | Overby, Jr. | G06F 9/50 |
| 2019/0081942 A1 * | 3/2019 | Suresh | H04L 67/1001 |
| 2020/0175154 A1 * | 6/2020 | Ratnakaram | G06F 21/32 |
| 2020/0313959 A1 * | 10/2020 | Higuchi | H04W 48/18 |

FOREIGN PATENT DOCUMENTS

WO    WO-2015103338 A1 *    7/2015    ............... G06F 9/00

OTHER PUBLICATIONS

Unknown, Oracle Database, Net Services Administrator's Guide, 12c Release 1 (12.1), E17610-12, Jul. 2017.

* cited by examiner

*Primary Examiner* — Sanchit K Sarker
(74) *Attorney, Agent, or Firm* — Potomac Law Group PLLC

(57) ABSTRACT

Embodiments establish a pool of tunnel connections using a secure protocol. A pool of tunnels can be initiated from endpoint connection managers to cloud connection managers, where a request is received from the endpoint connection managers by the cloud connection managers. A request from a cloud client to communicate with a secure computing device using a first of the endpoint connection managers is received at a first of the cloud connection managers. One of the pool of tunnels that is connected to the first endpoint connection manager is identified. The identified tunnel is configured to connect the cloud client and the first endpoint connection manager.

19 Claims, 5 Drawing Sheets

TUNNEL CONNECTIONS ESTABLISHED USING SECURE PROTOCOL

FIELD

The embodiments of the present disclosure generally relate to establishing a pool of tunnel connections using a secure protocol.

BACKGROUND

The proliferation of cloud computing has created connectivity challenges in computing environments. For example, connections between a cloud environment and client or customer environment (e.g., between a public cloud and a private cloud or a cloud network and an internal network) can pose significant security concerns. Tunnels, or networking connections established using communication protocols, can provide an efficient mechanism to communicate information between these computing environments. However, at times tunnels can be established over networks that are not secure, such as the public Internet, or other security concerns can exist. Accordingly, secure and efficient protocols for establishing and managing tunnel connections can provide meaningful technical benefits.

SUMMARY

The embodiments of the present disclosure are generally directed to systems and methods for establishing a pool of tunnel connections using a secure protocol. A pool of tunnels can be initiated from one or more endpoint connection managers to one or more cloud connection managers, where a request is received from each endpoint connection manager by at least one of the cloud connection managers. A request from a cloud client to communicate with a secure computing device using a first of the endpoint connection managers is received at a first of the cloud connection managers. One of the pool of tunnels that is connected to the first endpoint connection manager is identified. The identified tunnel is configured to connect the cloud client and the first endpoint connection manager.

Features and advantages of the embodiments are set forth in the description which follows, or will be apparent from the description, or may be learned by practice of the disclosure.

BRIEF DESCRIPTION OF THE DRAWINGS

Further embodiments, details, advantages, and modifications will become apparent from the following detailed description of the preferred embodiments, which is to be taken in conjunction with the accompanying drawings.

DETAILED DESCRIPTION

Figure 1:
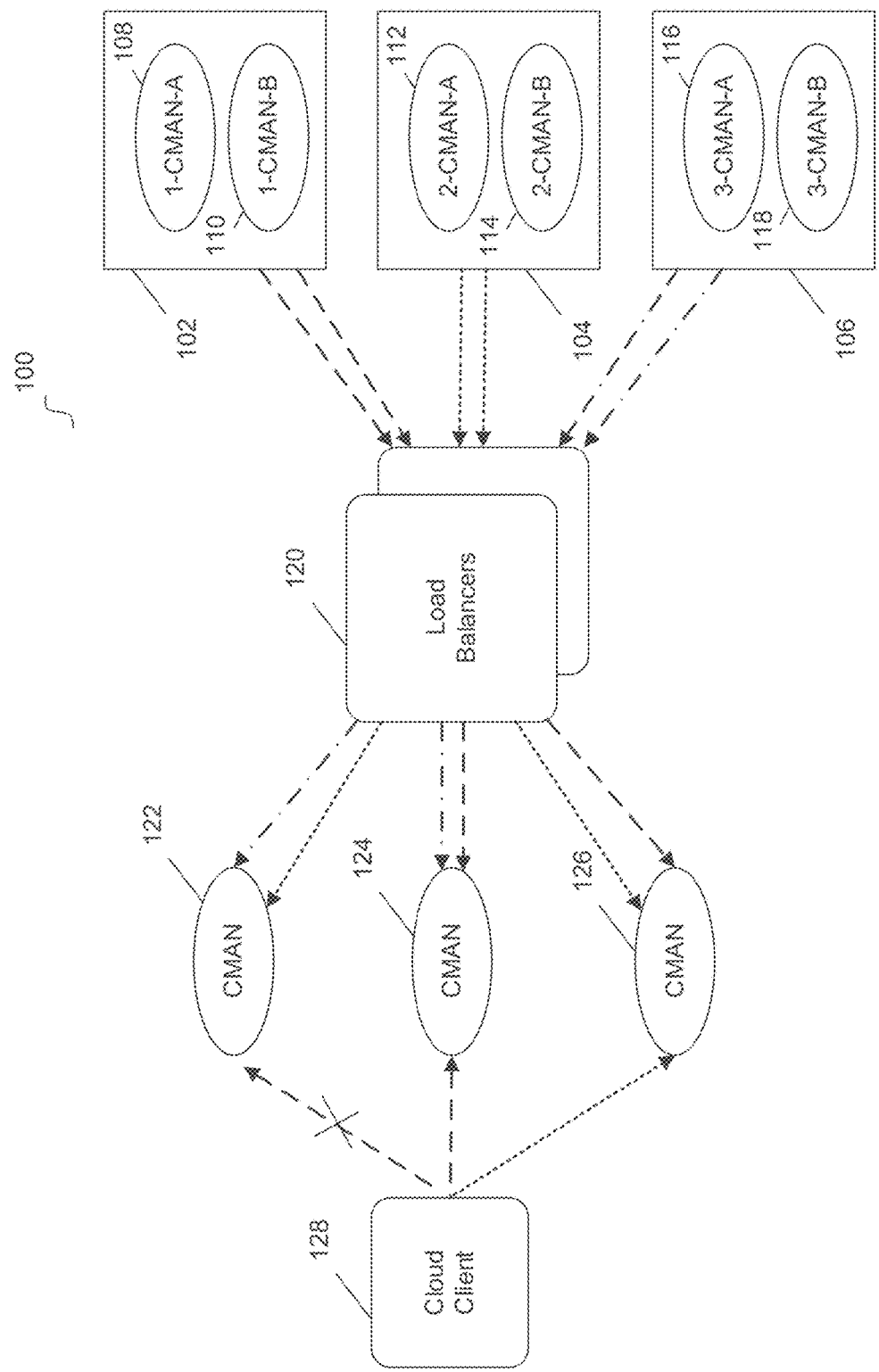
FIG. 1 illustrates a system for establishing a pool of tunnel connections using a secure protocol according to an example embodiment.

Embodiments establish tunnel connections using a secure protocol. For example, a tunnel can be a logical connection between computing devices or computing environments that implements one or more security and networking protocols. In some embodiments, the connected computing environments can be a cloud environment and an on-premise environment, two different cloud environments (e.g., with different security protocols or access rights, such as a public cloud and a private cloud), or any other suitable computing environments. The connectivity between environments can provide access to network connected resources. For example, a tunnel between a cloud client in a cloud environment and an on-premise environment can provide the cloud client access to a network connected on-premise data store. In some embodiments, the tunnel can communicate database related information between the connected environments, such as a query from the cloud client and query results from the network connected database.

Some secure environments may benefit from security protocols that restrict incoming connections. For example, incoming requests that originate from the public Internet may pose security threats. In some embodiments, to provide improved security for these environments, embodiments establish a pool of tunnel connections between a cloud environment and a plurality of endpoints. For example, the endpoints can be other cloud environments, on-premise environments, or any other suitable endpoint environment. In some implementations, one or more of the endpoint environments may benefit from a security protocol that does not permit inbound tunnel connection requests. For example, an on-premise environment with a secure data store may benefit from a policy that permits tunnel connections when the connection request is sent outbound, but not when the connection request is inbound and received over an unsecure network (e.g., the public Internet).

In some embodiments, the pool of tunnels can be established based on outbound requests that originate from the endpoint environments. For example, a cloud environment can include a plurality of connections managers ("CMANs"), each of a plurality of endpoint environments can include one or more CMANs, and the pool of tunnels can be established based on requests sent from the endpoint CMAN and received at the cloud CMAN. In some embodiments, a cloud client can then request to communicate with a particular endpoint environment. For example, the request can be processed by locating a cloud CMAN with an established tunnel to the particular endpoint CMAN. In some embodiments, the located tunnel can then be configured to enable communication between the cloud client and the endpoint environment (e.g., a network attached device within the endpoint environment). Embodiments thus enable tunnel communication with endpoint environments while maintaining a secure protocol for establishing the connection.

Reference will now be made in detail to the embodiments of the present disclosure, examples of which are illustrated in the accompanying drawings. In the following detailed description, numerous specific details are set forth in order to provide a thorough understanding of the present disclosure. However, it will be apparent to one of ordinary skill in the art that the present disclosure may be practiced without these specific details. In other instances, well-known methods, procedures, components, and circuits have not been described in detail so as not to unnecessarily obscure aspects of the embodiments. Wherever possible, like reference numbers will be used for like elements.

FIG. 1 illustrates a system for establishing a pool of tunnel connections using a secure protocol according to an example embodiment. System 100 includes endpoint environments 102, 104, and 106, CMAN-1-A 108, CMAN-1-B 110, CMAN-2-A 112, CMAN-2-B 114, CMAN-3-A 116, CMAN-3-B 118, load balancers 120, cloud CMANs 122, 124, 126, and cloud client 128. For example, endpoint environments 102, 104, and 106 can be cloud environments (e.g., private cloud), on-premise environments (e.g., an internal network), or any other suitable networking environment. In some embodiments, system 100 implements a secure tunnel protocol that protects endpoints environments 102, 104, and 106 from inbound connection requests that may not be secure. CMAN-1-A 108 and CMAN-1-B 110 can be connection managers for endpoint environment 102. Similarly, CMAN-2-A 112 and CMAN-2-B 114 can be connection managers for endpoint environment 104 and CMAN-3-A 116 and CMAN-3-B 118 can be connection managers for endpoint environment 106. Endpoint environments can have fewer or many more endpoint CMANs in various embodiments.

Load balancers 120 can receive connection requests from CMANs at endpoint environments and route these requests to cloud CMANs 122, 124, and 126. For example, cloud CMANs 122, 124, and 126 can be connections managers for a cloud environment, such as a public cloud or any other suitable cloud network. In some embodiments, the secure tunnel protocol implementation includes a cloud environment with cloud CMANs 122, 124, and 126, and the cloud environment permitting incoming tunnel requests from one or more of endpoint environments 102, 104, and 106 (e.g., from CMAN-1-A 108, CMAN-1-B 110, CMAN-2-A 112, CMAN-2-B 114, CMAN-3-A 116, CMAN-3-B 118, and the like).

In some embodiments, a pool of tunnels can be established at the cloud CMAN (e.g., 122, 124, and 126), where multiple connections with one or more endpoint environments can be established. For example, in the illustrated embodiment, cloud CMAN 122 includes tunnel connections with endpoint environments 104 and 106, cloud CMAN 124 includes tunnel connections with endpoint environments 102 and 106, and cloud CMAN 126 includes tunnel connections with endpoint environments 102 and 104. In some embodiments, the pool of tunnels can be established based on requests from the endpoint CMANs, where the requests can be a portion of a startup flow for an endpoint CMAN.

In some embodiments, cloud client 128 can be a client within the cloud environment (e.g., a registered client) that requests access to one or more of endpoint environments 102, 104, and/or 106. For example, endpoint environments 102, 104, and/or 106 can include a server or other connected devices (e.g., within a private network) and cloud client 128 can request access to the server or connected device. In some embodiments, cloud client 128 can be any suitable network client that requests access to an endpoint environment (e.g., a database client, a telnet client, file transfer protocol ('ftp') client, and the like), a cloud registered client (e.g., authenticated client), or any suitable client that is part of client/server communication (e.g., any software application client or logical client that communicates with a server).

Cloud client 128 can communicate with one or more of CMANs 122, 124, and 126 until a tunnel to the relevant endpoint environment is located. The located tunnel can then be configured to communicatively connect cloud client 128 with one of endpoint environments 102, 104, and/or 106. In some embodiments, the pool of tunnels at the cloud CMANs are established prior to any requests from cloud client 128 to communicate with an endpoint environment. For example, tunnels within the pool(s) can be reused by a plurality of cloud clients.

Figure 2:
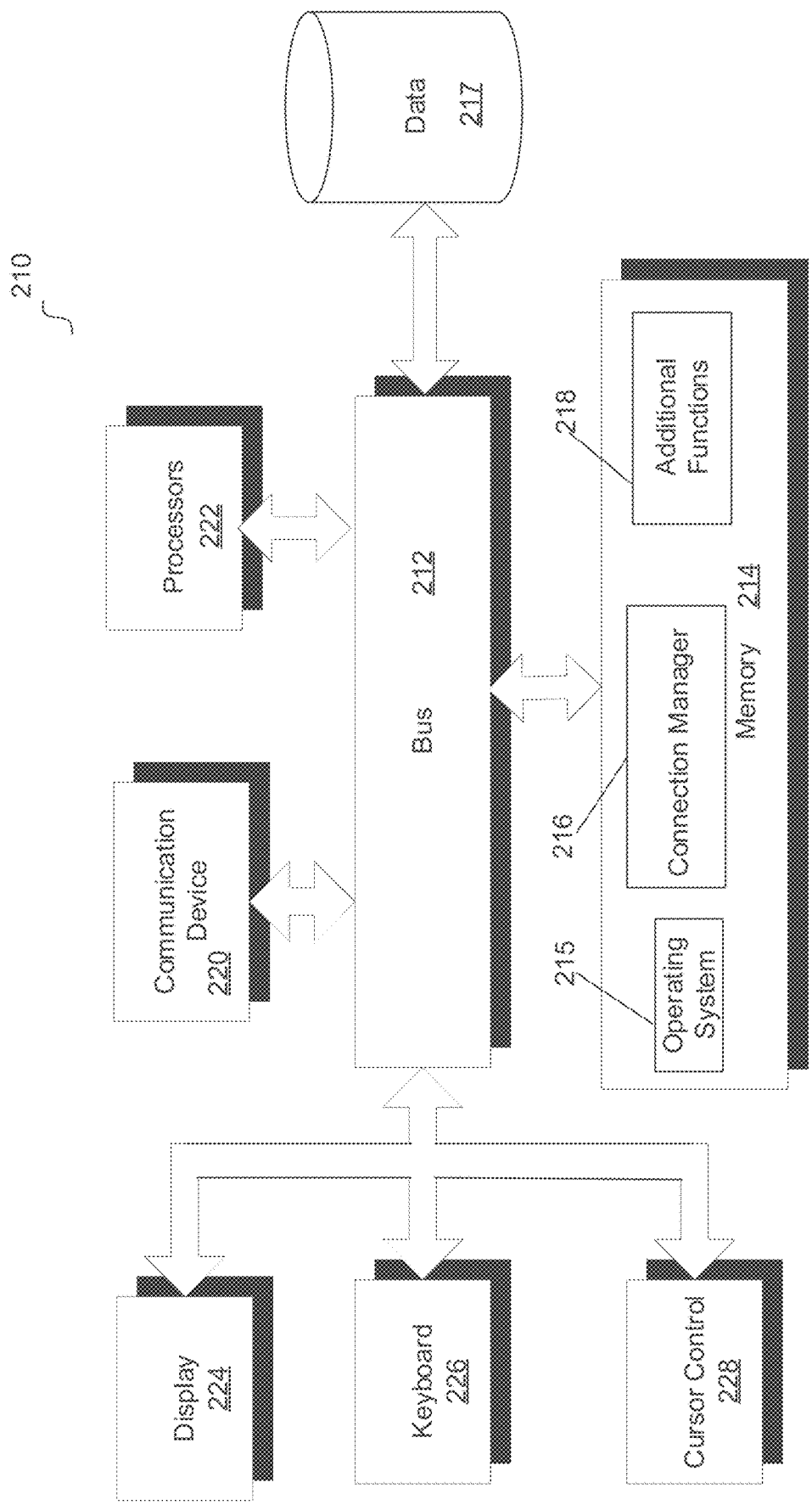
FIG. 2 illustrates a block diagram of a computing device operatively coupled to a prediction system according to an example embodiment.

FIG. 2 is a block diagram of a computer server/system 210 in accordance with embodiments. System 210 may be used to implement any or all of the components shown in FIG. 1. As shown in FIG. 2, system 210 may include a bus device 212 and/or other communication mechanism(s) configured to communicate information between the various components of system 210, such as processor 222 and memory 214. In addition, communication device 220 may enable connectivity between processor 222 and other devices by encoding data to be sent from processor 222 to another device over a network (not shown) and decoding data received from another system over the network for processor 222.

For example, communication device 220 may include a network interface card that is configured to provide wireless network communications. A variety of wireless communication techniques may be used including infrared, radio, Bluetooth®, Wi-Fi, and/or cellular communications. Alternatively, communication device 220 may be configured to provide wired network connection(s), such as an Ethernet connection.

Processor 222 may include one or more general or specific purpose processors to perform computation and control functions of system 210. Processor 222 may include a single integrated circuit, such as a micro-processing device, or may include multiple integrated circuit devices and/or circuit boards working in cooperation to accomplish the functions of processor 222. In addition, processor 222 may execute computer programs, such as operating system 215, connection manager 216, and other applications 218, stored within memory 214.

System 210 may include memory 214 for storing information and instructions for execution by processor 222. Memory 214 may contain various components for retrieving, presenting, modifying, and storing data. For example, memory 214 may store software modules that provide functionality when executed by processor 222. The modules may include an operating system 215 that provides operating system functionality for system 210. The modules can include an operating system 215, connection manager 216, as well as other applications modules 218. Operating system 215 provides operating system functionality for system 210. Connection manager 216 may provide system functionality for implementing a secure tunnel protocol, or may further provide any other functionality of this disclosure. In some instances, connection manager 216 may be implemented as an in-memory configuration.

Non-transitory memory 214 may include a variety of computer-readable medium that may be accessed by processor 222. For example, memory 214 may include any combination of random access memory ("RAM"), dynamic RAM ("DRAM"), static RAM ("SRAM"), read only memory ("ROM"), flash memory, cache memory, and/or any other type of non-transitory computer-readable medium.

Processor 222 is further coupled via bus 212 to a display 224, such as a Liquid Crystal Display ("LCD"). A keyboard 226 and a cursor control device 228, such as a computer mouse, are further coupled to communication device 212 to enable a user to interface with system 210.

In some embodiments, system 210 can be part of a larger system. Therefore, system 210 can include one or more additional functional modules 218 to include the additional functionality. Other applications modules 218 may include the various modules of the Oracle® Cloud, Oracle® Connection Manager, Oracle® Net components, for example. A database 217 is coupled to bus 212 to provide centralized storage for modules 216 and 218 and to store, for example, wireless device activity, and in some embodiments, user profiles, transactions history, etc. Database 217 can store data in an integrated collection of logically-related records or files. Database 217 can be an operational database, an analytical database, a data warehouse, a distributed database, an end-user database, an external database, a navigational database, an in-memory database, a document-oriented database, a real-time database, a relational database, an object-oriented database, Hadoop Distributed File System ("HFDS"), or any other database known in the art.

Although shown as a single system, the functionality of system 210 may be implemented as a distributed system. For example, memory 214 and processor 222 may be distributed across multiple different computers that collectively represent system 210. In one embodiment, system 210 may be part of a device (e.g., smartphone, tablet, computer, etc.).

In an embodiment, system 210 may be separate from the device, and may remotely provide the described functionality for the device. Further, one or more components of system 210 may not be included. For example, for functionality as a user or consumer device, system 210 may be a smartphone or other wireless device that includes a processor, memory, and a display, does not include one or more of the other components shown in FIG. 2, and includes additional components not shown in FIG. 2.

Referring back to FIG. 1, system 100 implements a secure tunnel protocol that protects endpoints environments 102, 104, and 106 from inbound connection requests that may not be secure. Embodiments create tunnel connections (e.g., from a customer premise to a cloud) and use these connections to relay data (e.g., between cloud client and a customer server/database). For example, some implementations of the connection creation techniques can remove an Internet facing access point from endpoints environments 102, 104, and 106 (e.g., from the customer premise or private network).

In conventional implementations, if a client (or a client component) is running in the cloud, a connection request can originate from the cloud to the customer premise. At times, this can be an architectural requirement or in some cases legacy applications may be designed in this way. In some circumstances, connecting to a customer premise requires an endpoint that is listening for incoming connection requests (e.g., received over the Internet). However, an endpoint that is open on the Internet can create security concerns or can even violate security policies.

Embodiments remove an Internet facing endpoint from a customer premise that is configured to communicate with a cloud client over a tunnel. For example, tunnel connections can be established from the customer premise to cloud, and these tunnels can be used to carry data between a cloud client and a customer server without changing the client and server. Embodiments are scalable (e.g., in terms of number of connections per customer) and provide a secure solution. In some embodiments, these tunnel connections can also be used for monitoring, control, and patching of devices or software at the customer premise.

In some embodiments, as many cloud implementations handle a high number of customers, embodiments provide tunnel responders that are scalable and secure. The example architectures allow cloud tunnel responders to have multiple worker processes and additional responder nodes can be provisioned based on the number of customers. Some conventional tunnel solutions are not scalable. For example, in order to mitigate security concerns, dedicated nodes are used on the cloud side for each customer. In some embodiments, a cloud tunnel responder can service a high number of customers (e.g., hundreds or thousands). Embodiments provide an efficient and scalable architecture thereby significantly cutting deployment costs while improving security and processing efficiency.

In some embodiments, the established tunnels can be multipurpose and can be used for monitoring, control, and patching. For example, embodiments establish persistent tunnel connections between an endpoint environment (e.g., customer premise) and a cloud environment. The persistent tunnel connection can be configured to carry database data, such as a query and search results obtained from a secure database using the query, as well as additional data. For example, the additional data can relate to monitoring the health and status of software and devices at the endpoint environment and/or software updates for the endpoint environment. In some embodiments, because the tunnel connections are persistent, they can be relied upon for monitoring and updating. For example, CMANs at the endpoint can be monitored and updated using the persistent tunnel connections.

Embodiments implement a tunnel initiator (client or endpoint CMAN) on the customer side and a tunnel responder (server or cloud CMAN) in the cloud. The tunnel initiators can create a pool of connections or tunnels with the tunnel responders. Referring back to FIG. 1, cloud CMANs 122, 124, and 126 can be tunnel responders while CMAN-1-A 108, CMAN-1-B 110, CMAN-2-A 112, CMAN-2-B 114, CMAN-3-A 116, and CMAN-3-B 118 can be tunnel initiators or endpoint CMANs. For example, as a part of a flow (e.g., startup flow) an endpoint CMAN gateway can connect to a cloud CMAN and create a connection, also known as a tunnel. The tunnel can be created based on an outgoing request from the endpoint CMAN that is received at the cloud CMAN on a channel (e.g., port) that the cloud CMAN has a configured listener.

In some embodiments, a plurality of tunnels can be established at a given cloud CMAN with one or more endpoints CMANs. With regard to endpoint environment 102 of FIG. 1, one or both of CMAN-1-A 108 and CMAN-1-B 110 can transmit an outgoing connection request (e.g., as part of a flow, such as a startup, reset, or other routine flow for the CMAN) to a cloud environment. The request can be received by load balancers 120, which can then route the request to one or more of cloud CMANs 122, 124, and 126. For example, the request can be routed to cloud CMAN 124, and thus a tunnel can be established between cloud CMAN 124 and endpoint environment 102 (via one or both of CMAN-1-A 108 and CMAN-1-B 110).

In some embodiments, cloud CMAN 122 can receive multiple tunnel requests, and thus a pool of tunnels can be established for the cloud CMAN. For example, the pool of tunnels can include multiple tunnels with a single endpoint environment or tunnels with a plurality of different endpoint environments. In some embodiments, for scalability, multiple tunnel responders (e.g., cloud CMANs) can be deployed. In the embodiment illustrated in FIG. 1, the pool of tunnels at cloud CMAN 122 includes connections with endpoint environments 104 and 106 (e.g., via one or multiple of CMAN-2-A 112, CMAN-2-B 114, CMAN-3-A 116, and/or CMAN-3-B 118), the pool of tunnels at cloud CMAN 124 includes connections with endpoint environments 102 and 106 (e.g., via one or multiple of CMAN-1-A 110, CMAN-1-B 112, CMAN-3-A 116, and/or CMAN-3-B 118), and the pool of tunnels for cloud CMAN 126 includes connections with endpoint environments 102 and 104 (e.g., via one or multiple of CMAN-1-A 108, CMAN-1-B 110, CMAN-2-A 112, and CMAN-2-B 114). For example, the pools of tunnels at each cloud CMAN can be established based on outgoing connection requests from an endpoint environment (e.g., endpoint CMAN) that are routed to a cloud CMAN by a load balancer (e.g., load balancers 120).

In some embodiments, during creation of the tunnels, an endpoint CMAN can request a connection to the cloud tunnel service, and the request can be handed off to a gateway/worker process in the cloud CMAN (e.g., least loaded gateway/worker process). The tunnel initiator (e.g., endpoint CMAN) can send a unique endpoint ID (e.g., customer ID, tunnel ID) to identify itself (e.g., identify an endpoint or customer environment in which the tunnel initiator/CMAN operates). For example, a port mapper function of the tunnel responder (e.g., cloud CMAN) can distribute the tunnels to a least loaded worker process and a tunnel-worker mapping can be maintained. A mapping between endpoint ID and the worker process can be registered with the port mapper (e.g., listener). In some embodiments, the gateway at the cloud CMAN can adopt the connection as a client-side connection.

In some embodiments, the established tunnels in the tunnel pool are persistent. For example, after tunnel creation the endpoint CMAN can switch the connection role from "calling" to "accepting" a connection. Based on this switch, the cloud CMAN is then able to configure the existing (persistent) tunnel for specific data or uses (e.g., as an Oracle® Net or SQL*Net connection for carrying database traffic). For example, the cloud CMAN can configure/use a tunnel connection and multiplex client sessions over it. Multiple endpoint CMANs are supported and can work independently. In some embodiments, an established tunnel between an endpoint CMAN and a cloud CMAN can be configured to connect a cloud client with the endpoint environment (e.g., a device, such as a data store, in the endpoint environment). For example, a cloud client (e.g., Observer) can connect to a cloud CMAN's listener.

In some embodiments, a cloud client can connect to the port mapper of a tunnel responder and can specify the endpoint/tunnel ID to which the client wants to connect. For example, referring back to FIG. 1, cloud client 128 can specify an endpoint/tunnel ID associated with a specific endpoint environment (e.g., customer environment) in a communication request (e.g., a request to communicate with a server at a specific customer environment). In some embodiments, the communication request can be a request to communicate with a secure computing device (e.g., secure server or secure database) within an endpoint environment using an endpoint CMAN. For example, cloud client 128 may request to communicate with a secure computing device located in endpoint environment 102 (using one of CMAN-1-A 108 or CMAN-1-B 110). In some embodiments, the request may include the address of the destination secure computing device.

In some embodiments, cloud client 128 submits such a request to one of more of cloud CMANs 122, 124, and 126 or the request is routed, redirected, or submitted to one of more of the cloud CMANs on behalf of the cloud client. In some embodiments, a port mapper (e.g., at a cloud CMAN) can pass the connection request to the appropriate worker process based on the mapping.

In some embodiments, the cloud CMANs can implement failover and load balancing. For example, a connection string can specify failover and/or load balancing, and the connect data can specify the endpoint/tunnel ID. The endpoint/tunnel ID can be specified using the TUNNEL_SERVICE_NAME parameter. In some embodiments, when a connection request is received from (or on behalf of) cloud client 128 at a cloud CMAN listener, the connection request can be routed to a gateway that has a tunnel connection to the requested endpoint/tunnel ID. The routing can be based on the endpoint/tunnel ID mapping registered in the cloud CMAN listener. In some embodiments, a failover protocol can be implemented (e.g., the client connection can be refused with an appropriate error) if the cloud CMAN does not have a tunnel connection to the requested endpoint/tunnel ID (e.g., the endpoint/tunnel ID included in the request) for multiplexing the client session or an identified tunnel has reached its configured max capacity. The cloud client can then failover to a next cloud CMAN.

Referring to FIG. 1, a request for a tunnel can be transmitted by or on behalf of cloud client 128, and the request can include the endpoint/tunnel ID associated with endpoint environment 102 (or 1-CMAN-A 108 or 1-CMAN-B 110). In some embodiments, cloud client 128 can connect to one or more of the cloud CMANs using Transfer Control Protocol ("TCP") or Transfer Control Protocol over Internet Protocol ("TCP/IP"). Initially, the request can be received by cloud CMAN 122, and it can be determined whether the pool of tunnels at cloud CMAN 122 includes a tunnel with the endpoint/tunnel ID specified in the request. For example, in the illustrated embodiment the pool of tunnels at CMAN 122 includes tunnels with endpoint environment 104 and endpoint environment 106, and thus no tunnel with an endpoint/tunnel ID specified in the request is available in the pool of tunnels at CMAN 122.

In some embodiments, the connection request can then be routed to another cloud CMAN, such as cloud CMAN 124. For example, cloud CMAN 122 can return an error or other indication that the requested tunnel is not available at the cloud CMAN and a failover technique can be used such that the request is submitted to a next available cloud CMAN (e.g., a next cloud CMAN that has not reached a maximum capacity of client sessions). In the illustrated embodiment, the next available cloud CMAN is cloud CMAN 124. When the request is received at cloud CMAN 124, a tunnel with the requested endpoint/tunnel ID is identified (e.g., using an endpoint/tunnel ID mapping registered in the cloud CMAN listener). A connection with endpoint environment 102 (or 1-CMAN-A 108 or 1-CMAN-B 110) can then be configured for cloud client 128 by configuring the identified tunnel (e.g., multiplexing the client connection over the tunnel). In the illustrated embodiment, cloud client 128 has also established a connection with endpoint environment 104 (or 2-CMAN-A 112 or 2-CMAN-B 114) via cloud CMAN 126.

In some embodiments, a configured tunnel/multiplexed connection for cloud client 128 communicatively connects the cloud client to an endpoint environment, and this connection (with the endpoint CMAN) can be used to connect the cloud client to a secure computing device within the endpoint environment (e.g., a secure computing device that cloud client 128 requested to communicate with). For example, the connection between cloud client 128 and endpoint environment 102 (e.g., using cloud CMAN 124 and CMAN-1-A 108 or CMAN-1-B 110) can be used to connect cloud client 128 to a secure computing device (e.g., secure database or server) at endpoint environment 102. In some embodiments, the address of the destination secure computing device can be sent from the cloud (via cloud client 128, cloud CMAN 124, or any other suitable cloud element), configured by the relevant endpoint connection manager, or in some cases auto discovered.

In some embodiments, communicatively connecting cloud client 128 with a secure computing device using an identified tunnel to an endpoint environment can be part of a multiplexing protocol. For example, as part of the protocol a new connection request can be associated with a unique session-id. A packet type indicating "new connection" can be sent to the endpoint CMAN and/or other relevant computing device. In some embodiments, the "new connection" packet type also contains the secure computing device destination address. Once the endpoint CMAN receives the new connection packet, the endpoint CMAN can create a connection (e.g., TCP or TCP/IP connection) with the address that is specified in the destination portion of "new connection" packet (e.g., secure computing device address). In some embodiments, cloud client 128 and the secure computing device can be communicatively connected using the connection between cloud client 128 and the cloud CMAN (e.g., TCP or TCP/IP connection), the connection between the cloud CMAN and the endpoint CMAN (e.g., the identified tunnel), and the connection between the endpoint CMAN and the secure computing device (e.g., TCP or TCP/IP connection).

In some embodiments, multiple client connections can be multiplexed over a single tunnel. For example, the number of tunnels that tunnel initiators can create and the number of connections that can be multiplexed over a tunnel are configurable. In some embodiments, these parameters can be used to size a tunnel responder. For example, the tunnel pool size at a cloud CMAN can be based on the number of cloud CMANs provisioned, a number of endpoint environments/CMANs to be serviced, or any other suitable factors. In some embodiments, Transport Layer Security ("TLS") protocol can be used to secure and authenticate the tunnel initiator (e.g., endpoint CMAN). For example, a domain name of TLS certificate can contain an endpoint ID for a requested tunnel connection (e.g., with a given endpoint environment). In some embodiments, the established tunnels can implement a transparent network substrate ("TNS") protocol.

In some embodiments, the established tunnels can be persistent tunnels that are reused by multiple cloud clients. For example, the persistent tunnels can be established, configured for a given cloud client, and can be reused by being configured for another cloud client. In some embodiments, once cloud client 128 has concluded use of the tunnel, it closes its connection with the relevant cloud CMAN. Using an example multiplexing protocol, the connection close request can be sent to the endpoint CMAN. In some embodiments, a packet type indicating end-of-file can be sent for the corresponding multiplexing session-id. The endpoint CMAN, upon receiving the connection close request and/or end-of-file packet type, can close its connection with the secure computing device. In some embodiments, this flow can terminate the cloud client's multiplexed tunnel session and open capacity for a new cloud client session.

In some embodiments, commands to monitor the health of tunnel initiators can also be routed over the tunnels. For example, the cloud side can send commands and push files for patching/updating to a specific tunnel initiator over established tunnels. In some embodiments, persistent tunnels can be used to transmit commands (e.g., from the cloud to the customer environment) that return health parameters of customer/endpoint CMANs, errors recorded internally or in logs, and general responsiveness using ping communication. For example, one or more of these commands can be issued periodically from the cloud.

Figure 3:
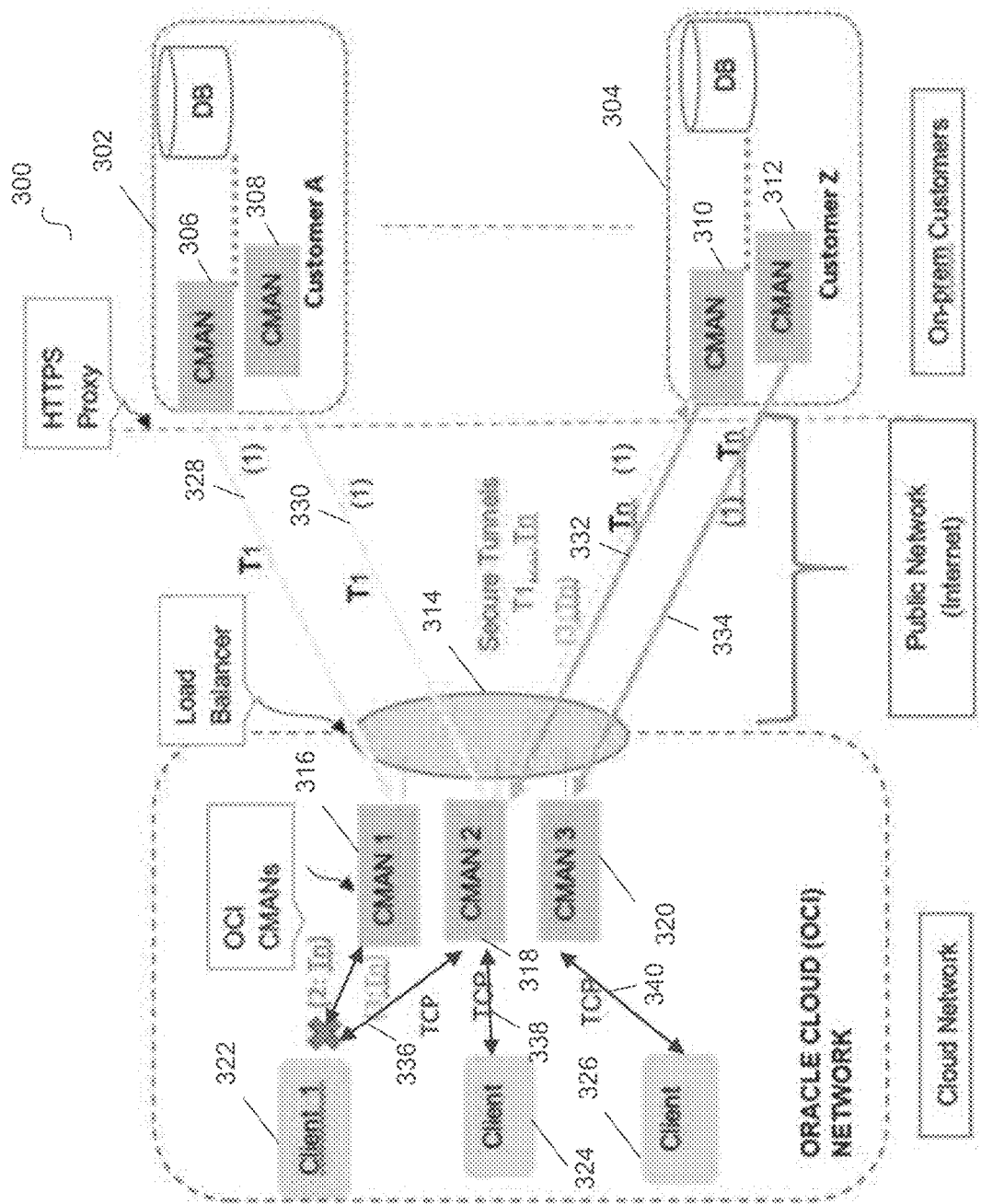
FIG. 3 illustrates a system with a failover protocol when tunnels are implemented between cloud connections managers and on-premise connection managers according to an example embodiment.

FIG. 3 illustrates a system with a failover protocol when tunnels are implemented between cloud connections managers and on-premise connection managers. In some embodiments, system 300 is similar to system 100 of FIG. 1. System 300 includes on-premise environments 302 and 304, customer CMANs 306, 308, 310, and 312, load balancer 314, cloud CMANs 316, 318, and 320, cloud clients 322, 324, and 326, tunnels 328, 330, 332, and 334, and connections 336, 338, and 340.

In some embodiments, cloud CMANs 316, 318, and 320 can be tunnel responders while customer CMANs 306, 308, 310, and 312 can be tunnel initiators or endpoint CMANs. For example, as a part of a flow (e.g., startup flow) a customer CMAN gateway can connect to a cloud CMAN and create a connection, also known as a tunnel. In some embodiments, a plurality of tunnels can be established at a given cloud CMAN with one or more customer CMANs. With regard to on-premise environment 302 of FIG. 3, one or both of customer CMANs 306 and 308 can transmit an outgoing connection request (e.g., as part of a flow, such as a startup, reset, or other routine flow for the CMAN) to a cloud environment. The request can be received by load balancers 314, which can then route the request to one or more of cloud CMANs 316, 318, and 320. For example, the request can be routed to cloud CMAN 316, and thus tunnel 328 can be established between cloud CMAN 316 and on-premise environment 302 (via customer CMAN 306).

In some embodiments, a cloud CMAN can receive multiple connection requests, and thus a pool of tunnels can be established for the cloud CMAN. In the embodiment illustrated in FIG. 3, cloud CMAN 316 has a pool of tunnels that includes tunnel 328, cloud CMAN 318 has a pool of tunnels that includes tunnels 330 and 332, and cloud CMAN 320 has a pool of tunnels that includes tunnel 334. For example, the pool of tunnels at each cloud CMAN can be established based on outgoing requests from on-premise environments (e.g., customer CMANs) that are routed to a cloud CMAN by a load balancer (e.g., load balancers 314).

In some embodiments, the customer CMAN can send a unique endpoint ID (e.g., customer ID, tunnel ID) with a request to establish a tunnel to identify itself (e.g., identify an on-premise or customer environment in which the CMAN operates). For example, a port mapper function of the cloud CMAN can distribute the tunnels to a least loaded worker process and a tunnel-worker mapping can be maintained. A mapping between endpoint/tunnel ID and the worker process can be registered with the port mapper (e.g., listener). The gateway at the cloud CMAN (e.g., receiving the request to establish the tunnel) can adopt the connection as a client-side connection.

In some embodiments, established tunnels can implement a plurality of protocols and carry data over various networks. For example, traffic between a customer environment and the cloud environment can be routed through a proxy (e.g., the customer's Hypertext Transfer Protocol ("HTTP")/Hypertext Transfer Protocol Secure ("HTTPS") proxy). In some embodiments, the cloud CMANs can be located in a cloud network (e.g., Oracle Cloud Network ("OCI")), the on-premise CMANs can be located in a customer network, and data can be carried between the cloud network and the customer network over the public Internet. For example, tunnels 328, 330, 332, and 334 can be configured to securely carry network traffic from a secure cloud environment to a secure on-premise environment over the (unsecure) public Internet.

In some embodiments, the established tunnels in the tunnel pool are persistent. For example, after tunnel creation the customer CMAN can switch the connection role from "calling" to "accepting" a connection. Based on this switch, the cloud CMAN is then able to configure the existing (persistent) tunnel for specific data or uses (e.g., as an Oracle® Net or SQL*Net connection for carrying database traffic). For example, the cloud CMAN can configure/use a tunnel connection and multiplex client sessions over it. Multiple customer CMANs are supported and can work independently.

In some embodiments, cloud clients 322, 324, and 326 can connect with on-premise environments 302 and 304 using persistent tunnels established between the cloud and on-premise environments (e.g., tunnels 328, 330, 332, and/or 334). For example, cloud client 322 can specify an endpoint/tunnel ID associated with an on-premise environment (or customer CMAN) in a connection request. In the embodiment illustrated in FIG. 3, cloud clients 322 and 324 are connected to one or both of on-premise environments 302 and 304 via cloud CMAN 318 (and the pool of tunnels at the cloud CMAN) and cloud client 326 is connected to one or both of on-premise environments 302 and 304 via cloud CMAN 320 (and the pool of tunnels at the cloud CMAN).

In some embodiments, cloud clients can request connections to on-premise environments via an established tunnel, and the cloud CMANs that receive these requests can route or process the requests using a failover protocol. For example, the request from the cloud client may be a request to communicate with a device (e.g., server) at a customer environment that includes an identifier (e.g., endpoint/tunnel ID). The embodiment illustrated in FIG. 3 shows an initial request from (or on behalf of) cloud client 322 received at cloud CMAN 316 that fails, where the request is then routed to cloud CMAN 318. For example, a brief summary of the flow can be:

(1) At startup, customer CMANs 306, 308, 310, and 312 (gateway process) can establish tunnels 328, 330, 332, and/or 334 with cloud CMANs 316, 318, and 320, where T1 . . . Tn are endpoint/tunnel/customer IDs.

(2) Cloud client 322 initially requests a tunnel with the ID Tn (with on-premise environment 304) from cloud CMAN 316, however the request is rejected (e.g., with "service not found") as cloud CMAN 316 does not have a tunnel with the ID Tn in its pool of tunnels.

(3) Using a failover protocol, cloud client 322's request for a tunnel with the ID Tn (automatic failover) is received at cloud CMAN 318, and thus cloud client 322 is able to obtain access to a tunnel with the ID Tn as cloud CMAN 318 includes one in its pool of tunnels.

In some embodiments, each endpoint environment (e.g., customer) is identifiable at the cloud side. For example, a customer TLS wallet can be configured with a customer ID as this identifier, and this identifier can be picked up as the endpoint/tunnel ID by a cloud CMAN. In some embodiments, a customer CMAN's gateway can answer the new request originating from the cloud and create an outgoing connection either to a fixed next hop or to the address sent by the requesting cloud client. For example, an established tunnel between a customer CMAN and a cloud CMAN can be configured to connect a cloud client with network connected devices at the customer environment. FIG. 3 illustrates secure databases located at on-premise environments 302 and 304. In some embodiments, tunnel 332 connects client 322 to on-premise environment 304 and the secure database located in the environment (e.g., via cloud CMAN 318 and customer CMAN 310).

Embodiments implement secure tunnel establishment using multiple protocols and techniques. In some embodiments, the outgoing connections are initiated from a customer side, such as an endpoint environment, so that the customer can forgo a public endpoint for ingress traffic. In some embodiments, a cloud side component can support multi-tenancy with traffic isolation across tenants. In some embodiments, data transfer over the public Internet can be encrypted.

In some embodiments, different customers can have overlapping service_names (e.g., database service_names), so per-customer identifier(s) can be used for connection establishment. This identifier can be sent while connecting to the cloud and can be validated. The client connection initiated inside the cloud (e.g., Oracle® Cloud Network) can also specify this identifier.

In some embodiments, a load balancer can be provisioned in front of tunnel listeners (e.g., cloud CMANs) for scaling and load balancing on the cloud side. In some embodiments, remote monitoring, control, and updating of endpoint/customer CMANs can be implemented from the cloud. In some embodiments, a cloud component can optionally listen on port 443 (or any other suitable port used for standard communications, such as TLS/SSL), such as when policies at the customer/endpoint allow only outbound traffic to this port. In some embodiments, the customer CMAN can be configured to listen on any port as no ingress traffic would be coming to it.

Figure 4:
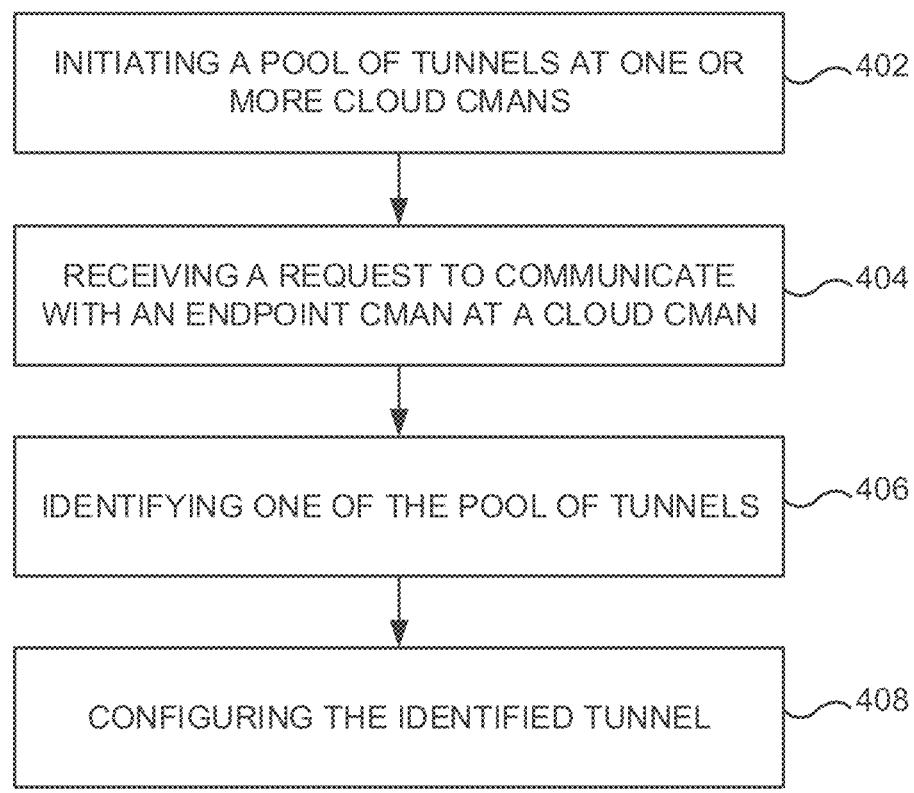
FIG. 4 illustrates a flow diagram for establishing a pool of tunnel connections using a secure protocol according to an example embodiment.

FIG. 4 illustrates a flow diagram for establishing a pool of tunnel connections using a secure protocol according to an example embodiment. In one embodiment, the functionality of FIG. 4 (and FIG. 5 below) is implemented by software stored in memory or other computer-readable or tangible medium, and executed by a processor. In other embodiments, each functionality may be performed by hardware (e.g., through the use of an application specific integrated circuit ("ASIC"), a programmable gate array ("PGA"), a field programmable gate array ("FPGA"), etc.), or any combination of hardware and software.

At 402, a pool of tunnels from one or more endpoint connection managers to one or more cloud connection managers can be initiated, where a request is received from each endpoint connection manager by at least one of the cloud connection managers. For example, each cloud connection manager can include its own pool of tunnels established with one or a plurality of endpoint connection managers. In some embodiments, each cloud connection manager can have a pool of tunnels with a plurality endpoint connection managers.

In some embodiments, the request is received from each endpoint connection manager by at least one of the cloud connection managers on a channel that the cloud connection managers are configured to have a listener. For example, the channel can be a port and the cloud connection managers can be configured such that a listener is configured for the port.

In some embodiments, the established tunnels can be persistent tunnels that are reused by multiple clients. For example, the persistent tunnels can be established, configured for a given cloud client, and can be reused by being configured for another cloud client. In some embodiments, the pool of tunnels can each be established based on outbound connection requests from the endpoint connection managers. In some embodiments, a load balancer can route connections requests received from the endpoint connection managers to the cloud connection managers.

At 404, a request to communicate with a secure computing device using a first of the endpoint connection managers can be received from a cloud client at a first of the cloud connection managers. For example, the first endpoint connection manager and the secure computing device may be part of a secure network, and the cloud client may request to communicate with secure computing device, where the request includes an identifier for the first endpoint connection manager. In some embodiments, the secure computing device can be a secure database or secure server.

At 406, one of the pool of tunnels that is connected to the first endpoint connection manager can be identified. In some embodiments, each established tunnel comprises an endpoint ID, and the identified tunnel is identified using an endpoint ID for the first endpoint connection manager. For example, the endpoint ID can uniquely identify an endpoint environment (e.g., secure customer on-premise network). In some embodiments, the endpoint ID is received from the endpoint connection manager when the tunnel is established. The endpoint ID can also be received in the request from the cloud client such that the identified tunnel can be identified using the ID. In some embodiments, the identified tunnel is an Oracle Net tunnel that implements a transparent network substrate ("TNS") protocol.

At 408, the identified tunnel can be configured to connect the cloud client and the first endpoint connection manager using the identified tunnel. In some embodiments, the identified tunnel is configured to connect the cloud client to a secure computing device using the first endpoint connection manager. For example, the secure computing device can be a secure database or secure server, and the cloud client can be connected to the secure database or secure server using the configured tunnel. In some embodiments, data communicated between the cloud client and the first endpoint connection manager over the identified tunnel can be database data including at least a query and data retrieved from a secure database using the query.

In some embodiments, the identified tunnel is a persistent tunnel between the first cloud connection manager and the first endpoint connection manager that is reused by a plurality of cloud clients. In some embodiments, the identified tunnel is configured to multiplex a plurality of connections between a single or a plurality of cloud clients and the first endpoint connection manager.

In some embodiments, the identified tunnel is established between the first cloud connection manager and the first endpoint connection manager prior to the cloud client request to communicate with the secure computing device. For example, the identified tunnel can be established between the first cloud connection manager and the first endpoint connection manager during a startup process for the first endpoint connection manager.

In some embodiments, the identified tunnel carries network traffic over the public Internet. In some embodiments, a security protocol for the first endpoint connection manager or a secure network that includes the first endpoint connection manager disallows incoming requests to establish a connection that arrives over the public Internet. For example, embodiments eliminate an Internet facing access point from the endpoint connection managers.

Figure 5:
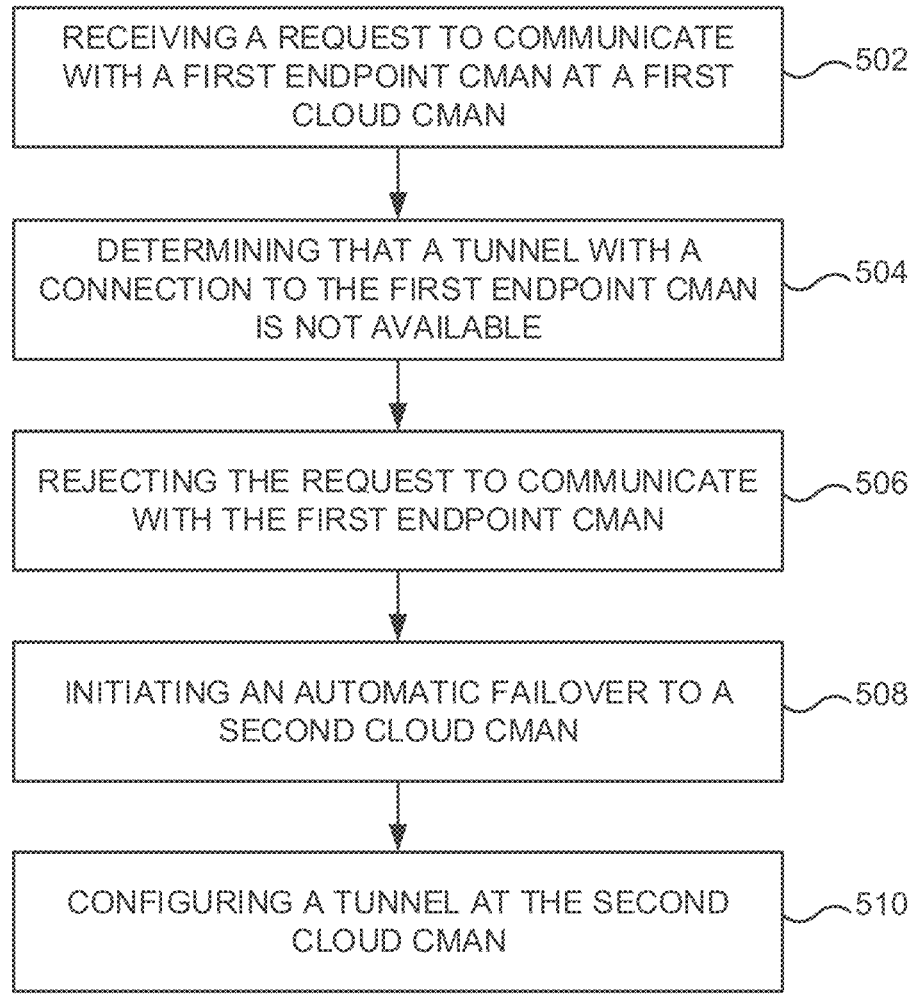
FIG. 5 illustrates a flow diagram for configuring a tunnel from a pool of tunnel connections using a secure protocol according to an example embodiment.

FIG. 5 illustrates a flow diagram for configuring a tunnel from a pool of tunnel connections using a secure protocol according to an example embodiment. In some embodiments, the functionality of FIG. 5 can be implemented along with the functionality of FIG. 4. For example, the functionality of FIG. 5 can be implemented by or with 404, 406, and/or 408 of FIG. 4.

At 502, receiving, at the first cloud connection manager, the request to communicate with a secure computing device using the first endpoint connection manager. For example, a cloud client may request to be communicatively connected with an endpoint environment (e.g., secure customer on-premise network) using one of the established tunnels in the pool of tunnels at the first cloud connection manager. In some embodiments, an endpoint ID for the tunnel may be included in the request.

At 504, based on the endpoint ID associated with the first endpoint connection manager, it can be determined that a tunnel with a connection to the first endpoint connection manager is not available in the pool of tunnels at the first cloud connection manager. For example, the first cloud connection manager can include a registry or mapping that identifies the endpoint IDs for the tunnels available in the pool at the connection manager. In some embodiments, it may be determined that a tunnel with the requested endpoint ID is not available.

At 506, the request to communicate with the first endpoint connection manager can be rejected by the first cloud connection manager when it is determined that a tunnel with a connection to the first endpoint connection manager is not available in the pool of tunnels at the first cloud connection manager. For example, a failure indication or service not available indication can be returned by the first cloud connection manager. At 508, an automatic failover can be initiated to the second cloud connection manager. For example, the automatic failover can include rerouting the request (or submitting another request) to a second cloud connection manager.

At 510, a tunnel at the second cloud connection manager can be configured to connect the cloud client and the first endpoint connection manager using the tunnel. For example, it can be determined that the pool of tunnels at the second cloud connection manager includes a tunnel with a connection to the first endpoint connection manager. In some embodiments, the determination can be made based on the endpoint ID included in the request and a mapping or registry available at the second cloud connection manager that identifies the tunnels available in its pool of tunnels. The tunnel can be identified using the endpoint ID and the identified tunnel can be configured to connect the cloud client and the first endpoint connection manager via the second cloud connection manager.

Embodiments establish tunnel connections using a secure protocol. For example, a tunnel can be a logical connection between computing devices or computing environments that implements one or more security and networking protocols. In some embodiments, the connected computing environments can be a cloud environment and an on-premise environment, two different cloud environments (e.g., with different security protocols or access rights, such as a public cloud and a private cloud), or any other suitable computing environments. The connectivity between environments can provide access to network connected resources. For example, a tunnel between a cloud client in a cloud environment and an on-premise environment can provide the cloud client access to a network connected on-premise data store. In some embodiments, the tunnel can communicate database related information between the connected environments, such as a query from the cloud client and query results from the network connected database.

Some secure environments may benefit from security protocols that restrict incoming connections. For example, incoming requests that originate from the public Internet may pose security threats. In some embodiments, to provide improved security for these environments, embodiments establish a pool of tunnel connections between a cloud environment and a plurality of endpoints. For example, the endpoints can be other cloud environments, on-premise environments, or any other suitable endpoint environment. In some implementations, one or more of the endpoint environments may benefit from a security protocol that does not permit inbound tunnel connection requests. For example, an on-premise environment with a secure data store may benefit from a policy that permits tunnel connections when the connection request is sent outbound, but not when the connection request is inbound and received over an unsecure network (e.g., the public Internet).

In some embodiments, the pool of tunnels can be established based on outbound requests that originate from the endpoint environments. For example, a cloud environment can include a plurality of connections managers ("CMANs"), each of a plurality of endpoint environments can include one or more CMANs, and the pool of tunnels can be established based on requests sent from the endpoint CMAN and received at the cloud CMAN. In some embodiments, a cloud client can then request to communicate with a particular endpoint environment. For example, the request can be processed by locating a cloud CMAN with an established tunnel to the particular endpoint CMAN. In some embodiments, the located tunnel can then be configured to enable communication between the cloud client and the endpoint environment (e.g., a network attached device within the endpoint environment). Embodiments thus enable tunnel communication with endpoint environments while maintaining a secure protocol for establishing the connection.

The features, structures, or characteristics of the disclosure described throughout this specification may be combined in any suitable manner in one or more embodiments. For example, the usage of "one embodiment," "some embodiments," "certain embodiment," "certain embodiments," or other similar language, throughout this specification refers to the fact that a particular feature, structure, or characteristic described in connection with the embodiment may be included in at least one embodiment of the present disclosure. Thus, appearances of the phrases "one embodiment," "some embodiments," "a certain embodiment," "certain embodiments," or other similar language, throughout this specification do not necessarily all refer to the same group of embodiments, and the described features, structures, or characteristics may be combined in any suitable manner in one or more embodiments.

One having ordinary skill in the art will readily understand that the embodiments as discussed above may be practiced with steps in a different order, and/or with elements in configurations that are different than those which are disclosed. Therefore, although this disclosure considers the outlined embodiments, it would be apparent to those of skill in the art that certain modifications, variations, and alternative constructions would be apparent, while remaining within the spirit and scope of this disclosure. In order to determine the metes and bounds of the disclosure, therefore, reference should be made to the appended claims.

We claim:

1. A method for establishing a pool of tunnel connections using a secure protocol, the method comprising:

initiating a pool of tunnels from one or more endpoint connection managers to one or more cloud connection managers, wherein a request is received from each endpoint connection manager by at least one of the cloud connection managers;

receiving, from a cloud client at a first of the cloud connection managers, a request to communicate with a secure computing device using a first of the endpoint connection managers;

identifying one of the pool of tunnels that is connected to the first endpoint connection manager; and configuring the identified tunnel to connect the cloud client and the first endpoint connection manager, wherein the identified tunnel is established between the first cloud connection manager and the first endpoint connection manager prior to the cloud client request to communicate with the secure computing device.

2. The method of claim 1, wherein the secure computing device comprises a secure database or secure server, and the cloud client is connected to the secure database or secure server using the configured tunnel.

3. The method of claim 2, wherein the secure computing device comprises a secure database, and data communicated between the cloud client and the first endpoint connection manager over the identified tunnel is database data comprising a query and data retrieved from the secure database using the query.

4. The method of claim 3, wherein the identified tunnel comprises an Oracle Net tunnel that implements a transparent network substrate (TNS) protocol.

5. The method of claim 2, wherein each established tunnel comprises an endpoint ID, and the identified tunnel is identified using the endpoint ID for the first endpoint connection manager.

6. The method of claim 5, wherein the pool of tunnels from each cloud connection manager connect to a plurality endpoint connection managers.

7. The method of claim 6, wherein identifying one of the pool of tunnels that is connected to the first endpoint connection manager further comprises:

receiving, at the first cloud connection manager, the request to communicate with the first endpoint connection manager;

determining, based on the endpoint ID associated with the first endpoint connection manager, that a tunnel with a connection to the first endpoint connection manager is not available in the pool of tunnels at the first cloud connection manager;

rerouting the request to a second cloud connection manager, wherein it is determined that the pool of tunnels at the second cloud connection manager comprises a tunnel with a connection to the first endpoint connection manager.

8. The method of claim 7, wherein rerouting the request to the second cloud connection manager further comprises:

rejecting, by the first cloud connection manager, the request to communicate with the first endpoint connection manager when it is determined that a tunnel with a connection to the first endpoint connection manager is not available in the pool of tunnels at the first cloud connection manager; and initiating an automatic failover to the second cloud connection manager.

9. The method of claim 1, wherein the identified tunnel is established between the first cloud connection manager and the first endpoint connection manager during a startup process for the first endpoint connection manager.

10. The method of claim 1, wherein the identified tunnel is a persistent tunnel between the first cloud connection manager and the first endpoint connection manager that is reused by a plurality of cloud clients.

11. The method of claim 10, wherein the identified tunnel is configured to multiplex a plurality of connections between a single or a plurality of cloud clients and the first endpoint connection manager.

12. The method of claim 1, wherein the identified tunnel carries network traffic over the public Internet.

13. The method of claim 12, wherein a security protocol for the first endpoint connection manager or a secure network that includes the first endpoint connection manager disallows incoming requests to establish a connection that arrives over the public Internet.

14. A system for establishing a pool of tunnel connections using a secure protocol, the system comprising:
a processor and memory storing instructions, wherein, when executing the instructions, the processor is configured to:
initiate a pool of tunnels from one or more endpoint connection managers to one or more cloud connection managers, wherein a request is received from each endpoint connection manager by at least one of the cloud connection managers;
receive, from a cloud client at a first of the cloud connection managers, a request to communicate with a secure computing device using a first of the endpoint connection managers;
identify one of the pool of tunnels that is connected to the first endpoint connection manager; and
configure the identified tunnel to connect the cloud client and the first endpoint connection manager, wherein the identified tunnel is established between the first cloud connection manager and the first endpoint connection manager prior to the cloud client request to communicate with the secure computing device.

15. The system of claim 14, wherein the secure computing device comprises a secure database or secure server, and the cloud client is connected to the secure database or secure server using the configured tunnel.

16. The system of claim 15, wherein the secure computing device comprises a secure database, and data communicated between the cloud client and the first endpoint connection manager over the identified tunnel is database data comprising a query and data retrieved from the secure database using the query.

17. The system of claim 15, wherein each established tunnel comprises an endpoint ID, and the identified tunnel is identified using the endpoint ID for the first endpoint connection manager.

18. The system of claim 17, wherein the pool of tunnels from each cloud connection manager connect to a plurality endpoint connection managers.

19. A non-transitory computer readable medium having instructions stored thereon that, when executed by a processor, cause the processor to establish a pool of tunnel connections using a secure protocol, wherein, when executed, the instructions cause the processor to:
initiate a pool of tunnels from one or more endpoint connection managers to one or more cloud connection managers, wherein a request is received from each endpoint connection manager by at least one of the cloud connection managers;
receive, from a cloud client at a first of the cloud connection managers, a request to communicate with a secure computing device using a first of the endpoint connection managers;
identify one of the pool of tunnels that is connected to the first endpoint connection manager; and
configure the identified tunnel to connect the cloud client and the first endpoint connection manager, wherein the identified tunnel is established between the first cloud connection manager and the first endpoint connection manager prior to the cloud client request to communicate with the secure computing device.

* * * * *